United States Patent
Yoshizaki et al.

(10) Patent No.: US 11,498,483 B2
(45) Date of Patent: Nov. 15, 2022

(54) METHODS AND SYSTEMS FOR MONITORING A BED VIEW FOR A VEHICLE

(71) Applicant: Toyota Motor Engineering & Manufacturing North America, Inc., Plano, TX (US)

(72) Inventors: Coh L. Yoshizaki, Wixom, MI (US); Umesh P. Naik, Ann Arbor, MI (US); David B. Auner, South Lyon, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 399 days.

(21) Appl. No.: 16/256,057

(22) Filed: Jan. 24, 2019

(65) Prior Publication Data

US 2020/0238905 A1    Jul. 30, 2020

(51) Int. Cl.
*B60R 1/00*     (2022.01)
*H04N 5/445*   (2011.01)
*H04N 5/247*   (2006.01)

(52) U.S. Cl.
CPC ............. *B60R 1/00* (2013.01); *H04N 5/247* (2013.01); *H04N 5/445* (2013.01); *B60R 2300/8006* (2013.01)

(58) Field of Classification Search
CPC .. B60R 1/00; B60R 2300/8006; H04N 5/445; H04N 5/247
See application file for complete search history.

(56) References Cited

U.S. PATENT DOCUMENTS

| | | | |
|---|---|---|---|
| 9,428,111 B2 | 8/2016 | Mokashi et al. | |
| 9,880,253 B2 | 1/2018 | Tan | |
| 2011/0057782 A1* | 3/2011 | Chundrlik, Jr. | B60R 1/00 340/436 |
| 2012/0229639 A1 | 9/2012 | Singleton | |
| 2016/0107575 A1* | 4/2016 | Mokashi | H04N 7/18 348/148 |
| 2017/0318267 A1 | 11/2017 | Kim et al. | |
| 2017/0327037 A1* | 11/2017 | Prakah-Asante | B60R 11/04 |
| 2018/0220082 A1 | 8/2018 | Lewis et al. | |
| 2018/0281697 A1 | 10/2018 | Snider et al. | |
| 2019/0100142 A1* | 4/2019 | Lynam | B60R 1/00 |

FOREIGN PATENT DOCUMENTS

DE    102012006185 A1    9/2012

OTHER PUBLICATIONS

Mark Williams, "2016 Ram HDs Will Offer New Camera Option", Jun. 28, 2015, URL: https://news.pickuptrucks.com/2015/06/28/.

* cited by examiner

*Primary Examiner* — Tat C Chio
(74) *Attorney, Agent, or Firm* — Dinsmore & Shohl LLP (57) ABSTRACT

A system for monitoring a bed of a vehicle is provided. The system includes a display, an input device, a first imaging device configured to capture one or more images of a bed of the vehicle, and a controller. The controller receives a first signal indicating a first activation of the input device, determines whether a speed of the vehicle is greater than a threshold in response to a receipt of the first signal, and instructs the display to display an image of the bed captured by the first imaging device for a first predetermined time in response to determining that the vehicle speed is greater than the threshold and in response to the receipt of the first signal.

19 Claims, 6 Drawing Sheets

METHODS AND SYSTEMS FOR MONITORING A BED VIEW FOR A VEHICLE

TECHNICAL FIELD

The present specification generally relates to vehicle systems for monitoring a bed of a vehicle (e.g., a pickup truck) and, more specifically, to vehicle systems that capture images of the bed of the vehicle and display the captured images for a limited period of time.

BACKGROUND

A driver of a vehicle, such as a pickup truck, may wish to view the status of the bed of the vehicle while driving. For example, the driver may want to check if objects loaded in a truck bed are tightly fastened. Thus, systems for effectively providing information about the status of the bed of a vehicle may be needed.

SUMMARY

In one embodiment, a vehicle includes a display, an input device, a first imaging device configured to capture one or more images of a bed of the vehicle, and a controller. The controller receives a first signal indicating a first activation of the input device, determines whether a speed of the vehicle is greater than a threshold in response to a receipt of the first signal, and instructs the display to display an image of the bed captured by the first imaging device for a first predetermined time in response to determining that the vehicle speed is greater than the threshold and in response to the receipt of the first signal.

In another embodiment, a system for monitoring a bed view of a vehicle is provided. The system includes one or more processors, one or more memory modules, and machine readable instructions stored in the one or more memory modules that, when executed by the one or more processors, cause the system to: receive a first signal indicating a first activation of an input device of the vehicle; determine whether a speed of the vehicle is greater than a threshold in response to receipt of the first signal; and instruct a display of the vehicle to display a bed view of the vehicle for a first predetermined time in response to determining that the vehicle speed is greater than the threshold and in response to receipt of the first signal.

In another embodiment, a method for monitoring a bed view of a vehicle is provided. The method includes receiving a first signal indicating a first activation of an input device of the vehicle; determining whether a speed of the vehicle is greater than a threshold in response to receipt of the first signal; and displaying, on a display of the vehicle, a bed view of the vehicle for a first predetermined time in response to determining that the vehicle speed is greater than the threshold and in response to receipt of the first signal.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
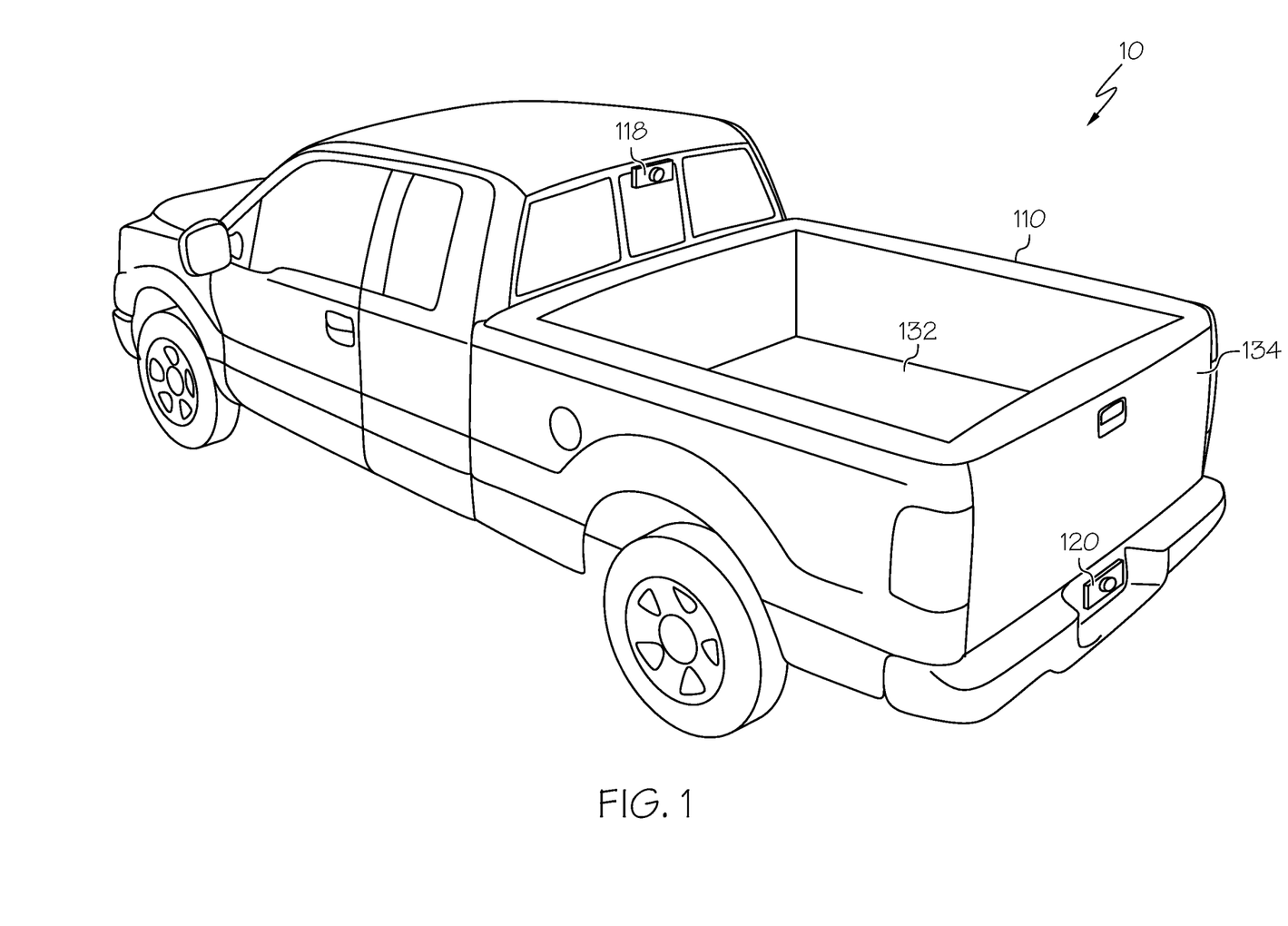
FIG. 1 depicts a vehicle having imaging devices for monitoring a bed of the vehicle, according to one or more embodiments shown and described herein.
Figure 3:
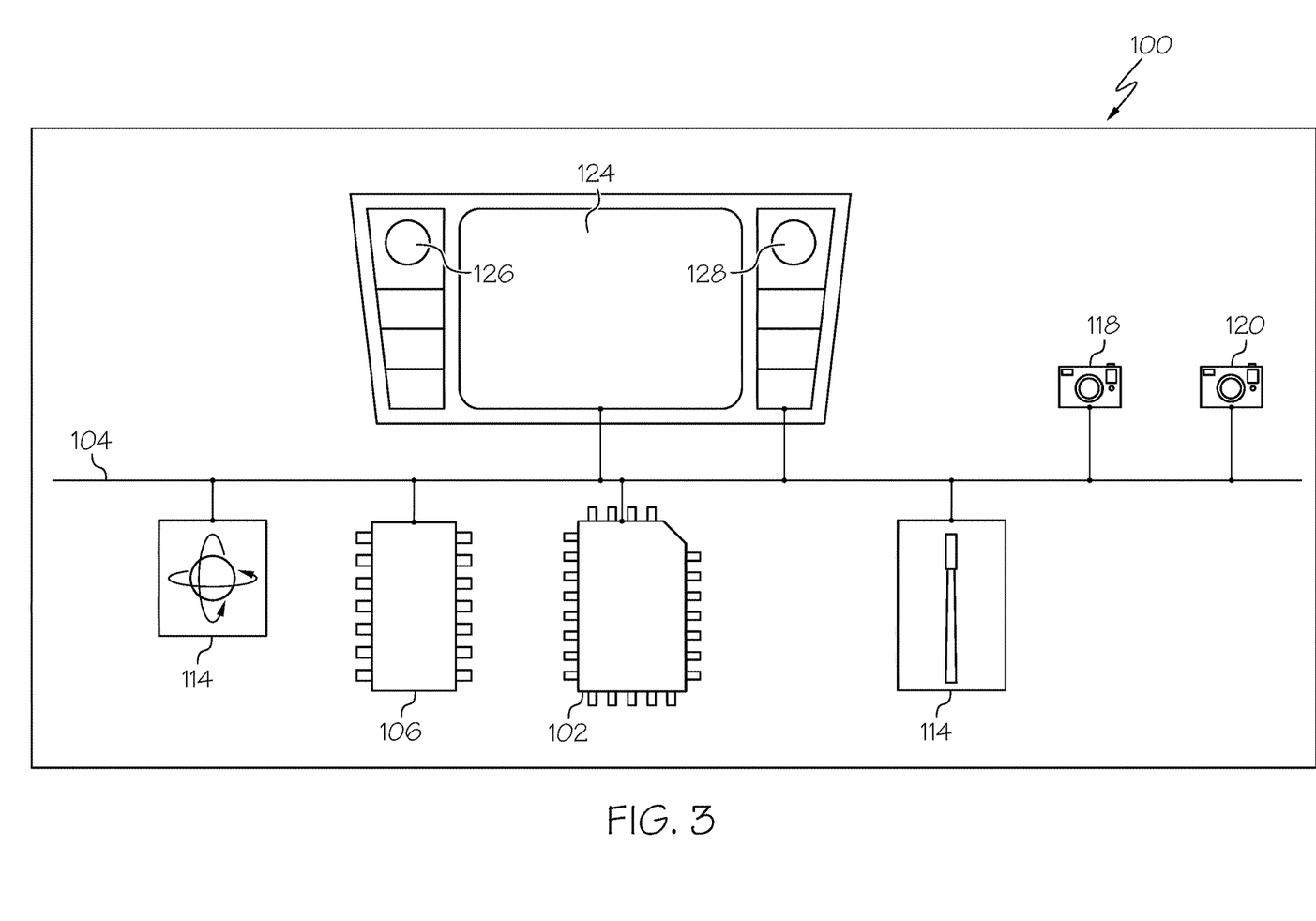
FIG. 3 depicts a schematic illustration of various components of a system for monitoring a bed view of a vehicle, according to one or more embodiments shown and described herein.

The embodiments disclosed herein include vehicle systems for monitoring a bed of a vehicle. Referring generally to FIGS. 1 and 3, a vehicle includes a display, an input device, a first imaging device configured to capture one or more images of a bed of the vehicle, and a controller. The controller receives a first signal indicating a first activation of the input device, determines whether a speed of the vehicle is greater than a threshold in response to a receipt of the first signal, and instructs the display to display an image of the bed captured by the first imaging device for a first predetermined time in response to determining that the vehicle speed is greater than the threshold and in response to the receipt of the first signal. According to the present disclosure, when the input device is activated, the display shows the bed view of the vehicle for a limited time such that a driver or passenger of the vehicle can quickly check the status of the bed and keep driving. The display goes back to a default screen (e.g., a navigational map, a radio screen, a navigation screen, etc.) after the predetermined time has passed, so that a duration of potential distraction due to the bed view is limited. Additionally, the image of the bed view may be restricted to the top of the tailgate of the vehicle so that the driver of the vehicle is not able to use the bed view image as a rear view monitor. In this regard, the system of the present disclosure further reduces distracting the driver and allows the driver to only check the bed. Various embodiments of the systems and methods for monitoring a bed view of a vehicle are described in greater detail herein.

FIG. 1 depicts a vehicle 10 having imaging devices for monitoring a bed of the vehicle 10, according to one or more embodiments shown and described herein. In embodiments, the vehicle 10 includes a cargo 110 for storing items. The cargo 110 includes a bed 132 on which cargo may be placed and a tailgate 134. The vehicle 10 includes a first imaging device 118 for monitoring the bed 132 of the vehicle 10. The first imaging device 118 may capture the images of the bed 132. In some embodiments, the vehicle 10 may include a second imaging device 120 that monitors a rear view of the vehicle 10 and captures images of the rear view. While FIG. 1 depicts two imaging devices 118 and 120, the vehicle 10 may include additional imaging devices. For example, additional imaging devices may be placed on the side of the vehicle, at the front of the vehicle, or the top of the vehicle. The details of the first and second imaging devices 118 and 120 will be described in detail below with reference to FIG. 3. The first and second imaging devices 118 and 120 may transmit captured images to one or more processors 102 (FIG. 3) of the vehicle 10.

Figure 2:
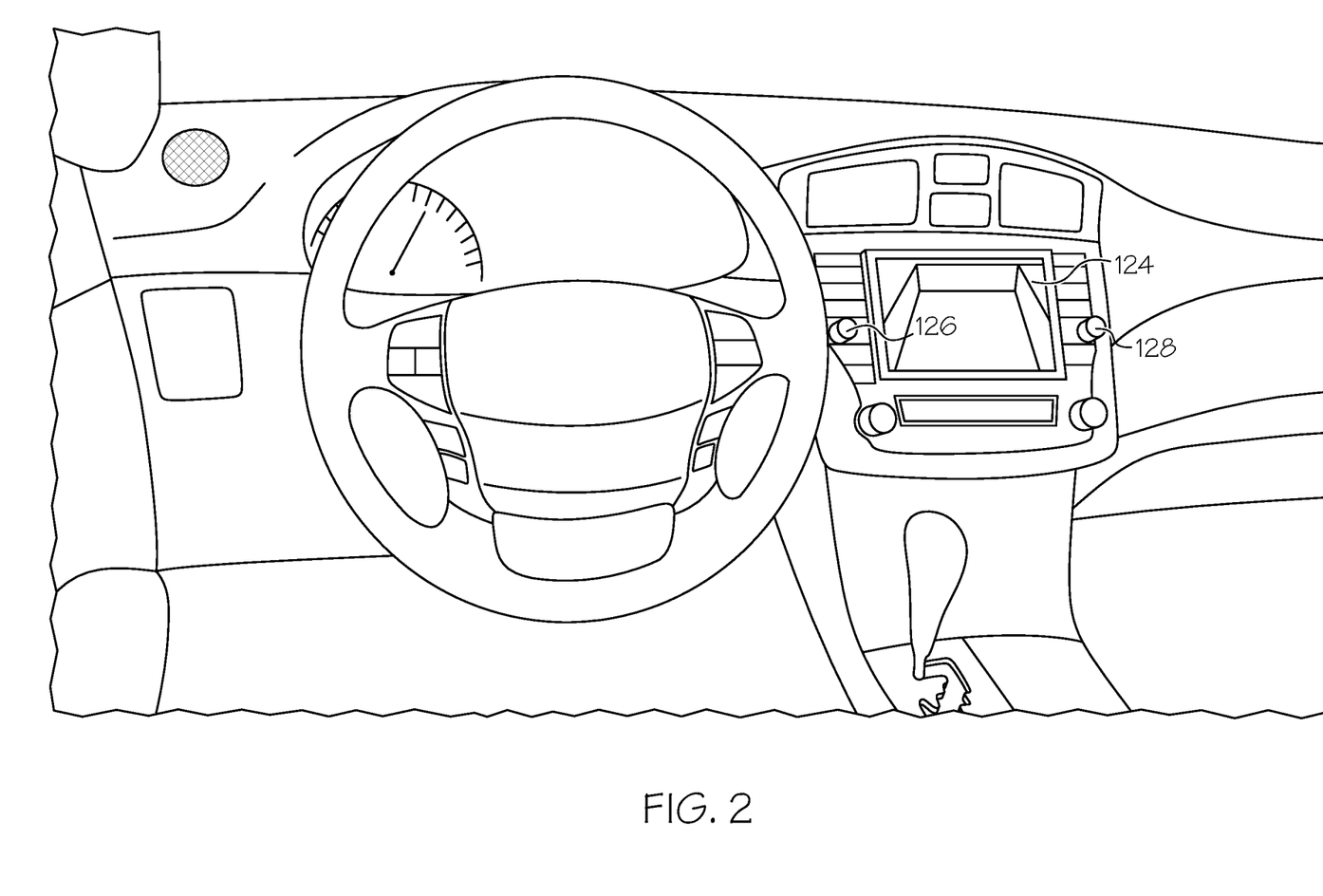
FIG. 2 depicts an internal view of the vehicle, according to one or more embodiments shown and described herein.

Referring now to FIG. 2, the one or more processors 102 (FIG. 3) may display the captured images on the display 124 in response to an activation of a switch 126 such that the driver or passenger of the vehicle may see the bed view or the rear view of the vehicle. For example, the display 124 of the vehicle 10 may display an image of the bed 132 captured by the first imaging device 118 in response to an activation of the switch 126, as shown in FIG. 2. The details of the switch 126 are described below with reference to FIG. 3. In some embodiments, the vehicle 10 may include a second switch 128. The display 124 of the vehicle 10 may display an image of a rear view of the vehicle 10 captured by the second imaging device 120 in response to an activation of the second switch 128. In some embodiments, the vehicle 10 may not include the second switch 128.

Referring now to FIG. 3, an embodiment of a bed monitoring system 100 is schematically depicted. It is noted that, while the bed monitoring system 100 is depicted in isolation, the bed monitoring system 100 may be included within a vehicle in some embodiments. In embodiments in which the bed monitoring system 100 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the system may be embedded within a mobile device (e.g., smartphone, laptop computer, etc.) carried by a driver of the vehicle.

The bed monitoring system 100 includes one or more processors 102. Each of the one or more processors 102 may be any device capable of executing machine readable and executable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the system. Accordingly, the communication path 104 may communicatively couple any number of processors 102 with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. In some embodiments, the communication path 104 may facilitate the transmission of wireless signals, such as WiFi, Bluetooth®, Near Field Communication (NFC) and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The bed monitoring system 100 includes one or more memory modules 106 coupled to the communication path 104. The one or more memory modules 106 may comprise RAM, ROM, flash memories, hard drives, or any device capable of storing machine readable and executable instructions such that the machine readable and executable instructions can be accessed by the one or more processors 102. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 106. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 3, the bed monitoring system 100 comprises the display 124 for providing visual output such as, for example, maps, navigation, entertainment, images, data received from an external device, or a combination thereof. The display 124 may output one of an external view including a bed view and a rear view of the vehicle, a navigational map, entertainment, and data received from an external device in response to a selection of the corresponding function. The display 124 may be coupled to the communication path 104. Accordingly, the communication path 104 communicatively couples the display 124 to other modules of the bed monitoring system 100. The display 124 may include any medium capable of transmitting an optical output such as, for example, a cathode ray tube, light emitting diodes, a liquid crystal display, a plasma display, or the like. Moreover, the display 124 may be a touchscreen that, in addition to providing optical information, detects the presence and location of a tactile input upon a surface of or adjacent to the display. Accordingly, the display may receive mechanical input directly upon the optical output provided by the display.

The bed monitoring system 100 comprises a switch 126. The switch 126 may be a physical knob or button that is manually actuated (e.g., by turning the knob or pressing the button) or an animated knob displayed on the display 124 that can be touched in order to be activated. In addition, the switch 126 may be configured to rotate around a center of the switch 126 to send an analog or digital scale input. In embodiments, in response to the activation of the switch 126, the bed monitoring system 100 displays an image of the bed 132 captured by the first imaging device 118. The image of the bed 132 may be zoomed in or zoomed out based on the rotation of the switch 126. For example, if the switch 126 is rotated clockwise, the image of the bed 132 may be zoomed in. If the switch 126 is rotated counterclockwise, the image of the bed 132 may be zoomed out. Although the switch 126 is positioned on the left side of the display 124 as shown in FIG. 2, the switch 126 may be positioned at any other suitable locations such as on the right side of the display 124 when a driver's seat is located on the right side of the display 124 and/or in the center (e.g., at the top or bottom of the display 124).

The bed monitoring system 100 comprises a second switch 128. The second switch 128 may be similar to the switch 126. In embodiments, in response to the activation of the second switch 128, the bed monitoring system 100 may display a rear view image of the vehicle 10 captured by the second imaging device 120. The second switch 128 may be configured to rotate around a center of the second switch 128 to send an analog or digital scale input. The image of the rear view may be zoomed in or zoomed out based on the rotation of the second switch 128. For example, if the second switch 128 is rotated clockwise, the image of the rear view may be zoomed in. If the second switch 128 is rotated counterclockwise, the image of the rear view may be zoomed out.

The bed monitoring system 100 comprises a satellite antenna 114 coupled to the communication path 104 such that the communication path 104 communicatively couples the satellite antenna 114 to other modules of the bed monitoring system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. Additionally, it is noted that the satellite antenna 114 may include at least one of the one or more processors 102 and the one or memory modules 106. In some embodiments, the bed monitoring system 100 does not include the satellite antenna 114.

Still referring to FIG. 3, the bed monitoring system may include one or more motion sensors 116 for detecting and measuring motion and changes in motion of the vehicle 10. Each of the one or more motion sensors 116 is coupled to the communication path 104 and communicatively coupled to the one or more processors 102. In some embodiments, the motion sensors 116 include inertial measurement units. In some embodiments, the one or more motion sensors 116 include one or more accelerometers and one or more gyroscopes. Each of the one or more motion sensors 116 transforms sensed physical movement of the vehicle 10 into a signal indicative of an orientation, a rotation, a velocity, or an acceleration of the vehicle 10. Based on the signals from the one or more motion sensors 116, the one or more processors 102 may determine whether the vehicle 10 is moving forward or rearward, accelerating or decelerating, or stopped. In some embodiments, the one or more motion sensors 116 include one or more wheel speed sensors, the output of which may be used to determine a speed of the vehicle 10.

Still referring to FIG. 3, the bed monitoring system 100 comprises the first imaging device 118. The first imaging device 118 is coupled to the communication path 104 and communicatively coupled to the one or more processors 102. The first imaging device 118 may be any device having an array of sensing devices (e.g., pixels) capable of detecting radiation in an ultraviolet wavelength band, a visible light wavelength band, or an infrared wavelength band. The first imaging device 118 may have any resolution. The first imaging device 118 may include an omni-directional camera, or a panoramic camera. In some embodiments, one or more optical components, such as a mirror, fish-eye lens, or any other type of lens may be optically coupled to at least one of the first imaging device 118. The first imaging device 118 may be located on an exterior of the vehicle, e.g., as shown in FIG. 1 to capture an image of the bed 132 of the vehicle 10. The first imaging device 118 may transmit the captured images to the one or more processors 102 via the communication path 104.

Still referring to FIG. 3, the bed monitoring system 100 comprises the second imaging device 120. The second imaging device 120 is coupled to the communication path 104 and communicatively coupled to the one or more processors 102. The second imaging device 120 may be similar to the first imaging device 118. The second imaging device 120 may be located on an exterior of the vehicle, e.g., as shown in FIG. 1 to capture a rear view of the vehicle 10. The second imaging device 120 may transmit the captured images to the one or more processors 102 via the communication path 104.

Still referring to FIG. 3, the bed monitoring system 100 can be formed from a plurality of modular units, i.e., the display 124, the first imaging device 118, and the second imaging device 120 can be formed as modules communicatively coupled form the bed monitoring system 100. Accordingly, in some embodiments, each of the modules can include at least one of the one or more processors 102 and/or the one or more memory modules 106. Accordingly, it is noted that, while specific modules may be described herein as including the one or more processors 102 and/or the one or more memory modules 106, the embodiments described herein can be implemented with the processors 102 and memory modules 106 distributed throughout various communicatively coupled modules.

Figure 4:
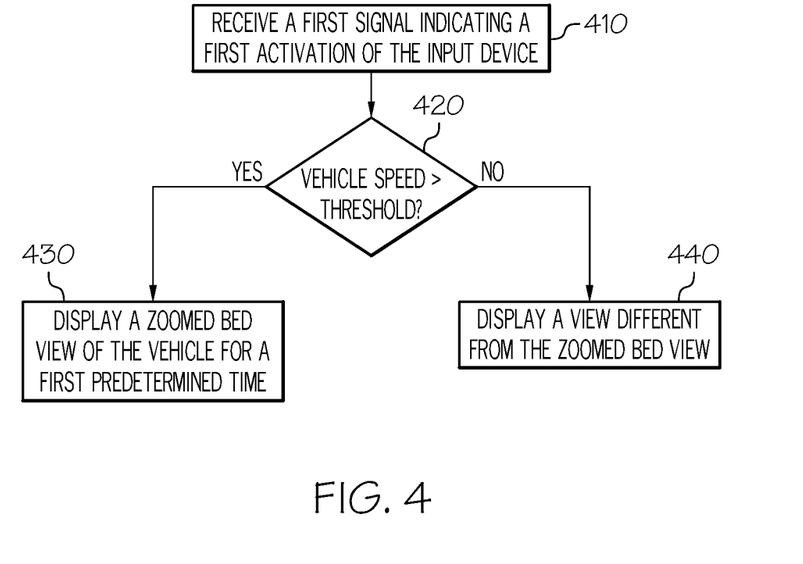
FIG. 4 depicts a flowchart for displaying a zoomed bed view of a vehicle in response to an actuation of a switch, according to one or more embodiments shown and described herein.

FIG. 4 depicts a flowchart for displaying a zoomed bed view of the vehicle 10 in response to an actuation of a switch, according to one or more embodiments shown and described herein.

In step 410, the bed monitoring system 100 receives a first signal indicating a first activation of an input device. In embodiments, the bed monitoring system 100 receives a signal indicating the activation of the switch 126 from the switch 126. For example, a driver or a passenger of the vehicle 10 may press or touch the switch 126, and the switch 126 transmits a signal indicating the activation of the switch 126 to the one or more processors 102.

In step 420, the bed monitoring system 100 determines whether the speed of the vehicle 10 is greater than a threshold value. The speed of the vehicle 10 may be measured by the one or more motion sensors 116 (e.g., by calculating the speed of the vehicle 10 based on an output from the wheel speed sensors in embodiments in which the one or more motion sensors 116 include one or more wheel speed sensors). The one or more motion sensors 116 measure the speed of the vehicle 10 and transmit the speed information to the one or more processors 102. The one or more processors 102 may compare the speed of the vehicle 10 to the threshold value. The threshold value may be stored in the one or more memory modules 106. The threshold value may be, for example, 70 miles per hour, 65 miles per hour, 55 miles per hour, 45 miles per hour, 35 miles per hour, 35 miles per hour, 25 miles per hour, 10 miles per hour, 5 miles per hour, 0 miles per hour etc. If the vehicle speed is greater than the threshold value (YES at step 420), the process proceeds to step 430. If the vehicle speed is not greater than the threshold value (NO at step 420), the process proceeds to step 440.

In some embodiments, the bed monitoring system 100 may determine whether the vehicle moves forward or backward instead of determining whether the speed of the vehicle 10 is greater than a threshold value in step 420. For example, the bed monitoring system 100 may determine whether the vehicle moves forward or backward based on signals from the one or more motion sensors 116. As another example, the bed monitoring system 100 may determine whether the vehicle moves forward or backward based on signals from a gear transmission of the vehicle. In such alternative embodiments, if it is determined that the vehicle is moving forward, the process proceeds to step 430, but if it is determined that the vehicle is moving rearward, the process proceeds to step 440.

In step 430, the bed monitoring system 100 displays a zoomed bed view of the vehicle for a first predetermined time. In embodiments, the bed monitoring system 100 displays a zoomed bed view of the vehicle 10 as shown in FIG. 2. The zoomed bed view may be, for example, a predetermined zoomed image of the bed 132 where the top boundary of the image substantially overlaps with the top of the tailgate 134 of the vehicle in the image. As another example, the zoomed bed view may be a predetermined zoomed image of the bed 132 where there is no or minimal predetermined margin between the top of the zoomed image and the top of the tailgate 134 in the image. The first predetermined time may be stored in the one or more memory modules 106. The first predetermined time may be, for example, 5 seconds, 10 seconds, 15 seconds, etc. Displaying the zoomed bed view of for the first predetermined time may allow the driver to temporarily check the status of the bed 132. After the bed monitoring system 100 displays the zoomed bed view of the vehicle for the first predetermined time, the display 124 returns to a display mode before displaying the zoomed bed view, e.g., a navigational map.

In step 440, the bed monitoring system 100 displays a view different from the zoomed bed view. In embodiments, the bed monitoring system 100 may display a rear view captured by the second imaging device 120 in FIG. 1. For example, when the vehicle 10 is stopped or moving rearward, in response to the activation of the switch 126, the display 124 may display a rear view captured by the second imaging device 120. In some embodiments, the bed monitoring system 100 may display the zoomed bed view of the vehicle without time restriction in response to determining that the vehicle speed is not greater than the threshold value. For example, in response to determining that the vehicle speed is not greater than the threshold value, the display 124 displays the zoomed bed view until the driver or passenger instructs the display to stop displaying the zoomed bed view.

Figure 5:
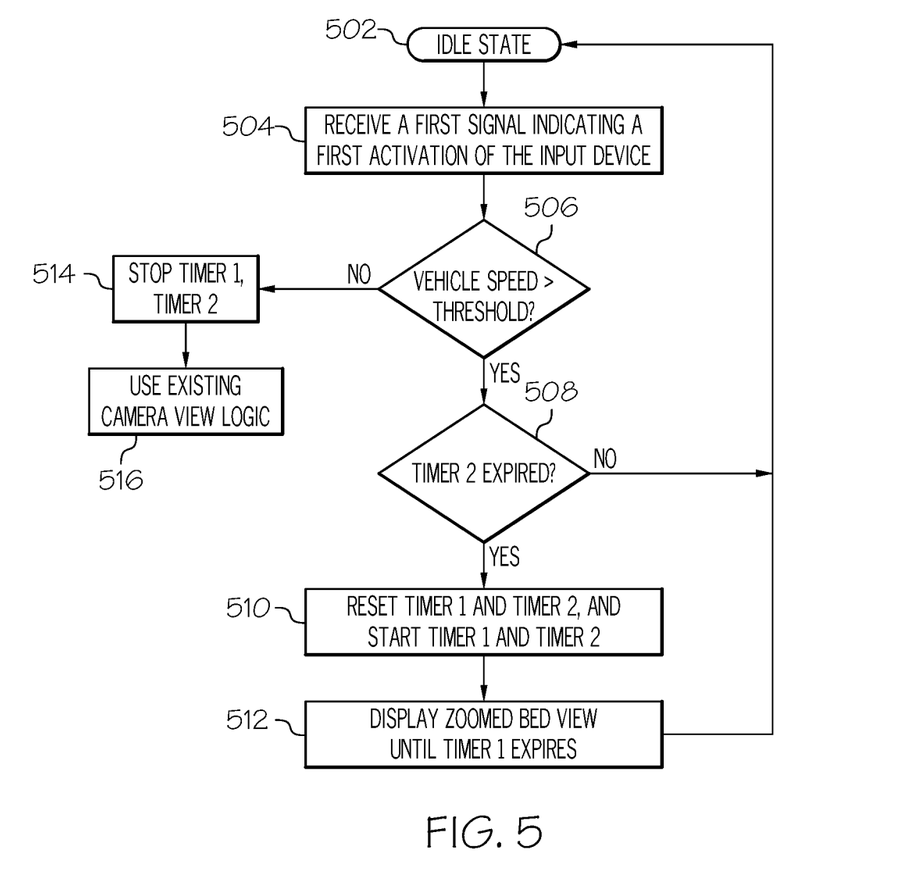
FIG. 5 depicts a flowchart for displaying a zoomed bed view of a vehicle in response to an actuation of a switch, according to one or more embodiments shown and described herein.

FIG. 5 depicts a flowchart for displaying a zoomed bed view of a vehicle in response to an activation of a switch, according to one or more embodiments shown and described herein. In embodiments, the bed monitoring system 100 includes a first timer and a second timer. The first timer sets a first time duration for displaying a zoomed bed view of the vehicle 10 in response to the activation of the switch. The first time duration may be stored in the one or more memory modules 106. The first time duration may be a time duration sufficient to allow the driver to temporarily check the status of the bed (e.g., 5 seconds, 10 seconds, 15 seconds, etc.). The second timer sets a second time duration that a driver needs to wait, after a zoomed bed view is displayed, to view the next zoomed bed view. In some embodiments, the second time duration is longer than the first time duration, for example, 1 minute, 2 minutes, etc.

In step 502, the bed monitoring system 100 is in an idle state. That is, the bed monitoring system 100 does not receive an input from an input device, e.g., the switch 126 in FIG. 2. While the bed monitoring system 100 is in an idle state, the display 124 may display default content, e.g., a navigational map, an audio system interface, entertainment information, etc. For example, by referring to FIG. 6, at time t=0, the display 124 displays a navigational map.

In step 504, the bed monitoring system 100 receives a first signal indicating a first activation of the input device. In embodiments, a driver or passenger of the vehicle 10 presses the switch 126, and the bed monitoring system 100 receives a signal indicating a first activation of the switch 126. For example, by referring to FIG. 6, at time t=$t_1$, the switch 126 is activated.

In step 506, the bed monitoring system 100 determines whether the speed of the vehicle 10 is greater than a threshold value. The speed of the vehicle 10 may be measured by the one or more motion sensors 116 as described above. The one or more motion sensors 116 measure the speed of the vehicle 10 and transmit the speed information to the one or more processors 102. The one or more processors 102 may compare the speed of the vehicle 10 to the threshold value. The threshold value may be stored in the one or more memory modules 106. If the vehicle speed is greater than the threshold value (YES at step 506), the process proceeds to step 508. If the vehicle speed is not greater than the threshold value (NO at step 506), the process proceeds to step 514.

In step 508, the bed monitoring system 100 determines whether the second timer expired. If it is determined that the second timer has not been expired, the process returns to step 502, and waits for the next activation of the input device. If it is determined that the second timer has expired (YES at step 508), sufficient time has lapsed since the last display of the zoomed bed view, and the process proceeds to step 510.

Figure 6:
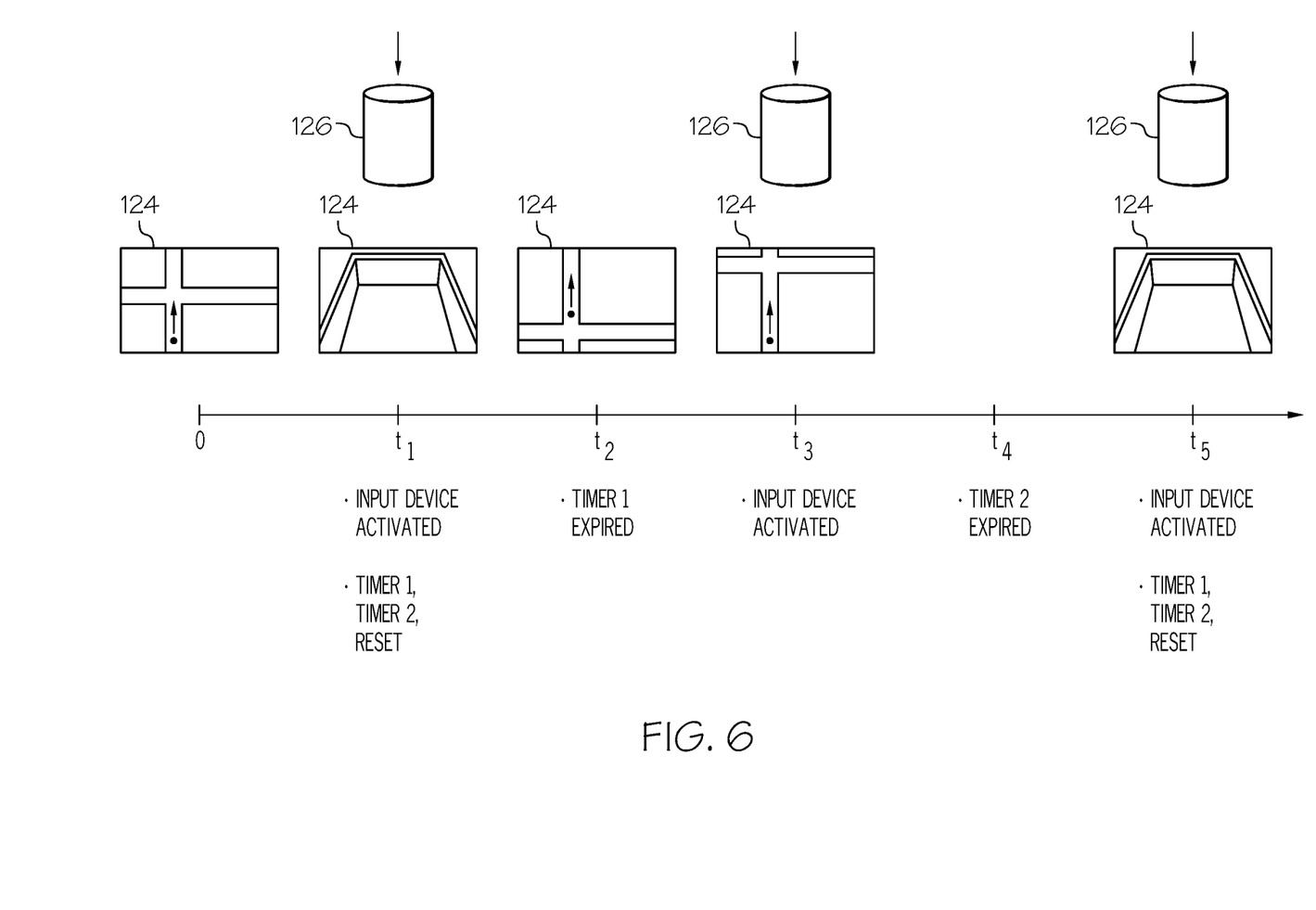
FIG. 6 depicts operations of a display and a switch versus time, according to one or more embodiments shown and described herein.

In step 510, the bed monitoring system 100 resets the first timer and the second timer and starts the first timer and the second timer. For example, by referring to FIG. 6, the bed monitoring system 100 resets the first timer and the second timer at time=$t_1$ when the switch 126 is pressed. In step 512, the bed monitoring system 100 displays a zoomed bed view until the first timer expires. In embodiments, the bed monitoring system 100 displays a zoomed bed view captured by the first imaging device 118 on the display 124 for the first time duration set by the first timer. For example, by referring to FIG. 6, the display 124 displays a zoomed bed view until the first timer expires at time=$t_2$. When the first timer expires, the display 124 switches back to the previous display mode. For example, the display 124 starts displaying the previous navigational map at time t=$t_2$ as shown in FIG. 6.

After the display 124 initiates displaying the zoomed bed view in step 512, the process returns to step 502 and waits for another activation of the input device. The bed monitoring system 100 may receive a second signal indicating a second activation of the input device in step 504. For example, by referring to FIG. 6, the driver of the vehicle 10 may press the switch 126 and the bed monitoring system 100 may receive the second signal indicating a second activation of the switch 126 at time t=$t_3$. Then, the bed monitoring system 100 again determines whether the vehicle speed is greater than a threshold value in step 506. If the vehicle speed is greater than the threshold value (YES at step 506), then the bed monitoring system 100 determines whether the second timer has expired in step 508 in response to the second activation of the input device. If the bed monitoring system 100 determines that the second timer has not expired (NO at step 508), the display 124 continues displaying what is currently being displayed without changing to a zoomed bed view. For example, by referring to FIG. 6, at time t=t$_3$, the second timer is not expired yet, and thus, the display 124 continues displaying the navigational map even in response to the second activation of the switch 126.

If the bed monitoring system 100 determines that the second timer has expired, the display 124 displays a zoomed bed view and the bed monitoring system resets the first timer and the second timer. For example, by referring to FIG. 6, at time t=t$_5$, the switch is pressed, and the second timer expired at time t=t$_4$. Then, the display 124 displays a zoomed bed view and the bed monitoring system resets the first timer and the second timer.

In step 514, the bed monitoring system 100 stops a first timer and a second timer when it is determined the vehicle speed is not greater than the threshold value. In step 516, the bed monitoring system 100 uses existing camera view logic to display content on the display 124. For example, the bed monitoring system 100 displays a default camera view, e.g., a rear view of the vehicle 10 captured by the second imaging device 120.

It should be understood that embodiments described herein are directed to systems for monitoring a bed view of a vehicle. A vehicle system includes a display, an input device, a first imaging device configured to capture one or more images of a bed of the vehicle, and a controller configured to receive a first signal indicating a first activation of the input device, determine whether a speed of the vehicle is greater than a threshold in response to a receipt of the first signal, and instruct the display to display an image of the bed captured by the first imaging device for a first predetermined time in response to determining that the vehicle speed is greater than the threshold and in response to the receipt of the first signal. According to the present disclosure, when the input device is activated, the display displays a bed view for a limited time such that a driver or passenger of the vehicle can quickly check the status of the bed and keep driving. The display returns to a default screen (e.g., a navigational map, a radio screen, a navigation screen, etc.) after the predetermined time has passed, so that a duration of potential distraction is limited. Additionally, the image of the bed view may be restricted to the top of the tailgate of the vehicle so that a driver of the vehicle is not able to use the bed view image as a rear view monitor. In this regard, the system of the present disclosure further reduces distracting the driver and allows the driver to only check the bed.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a display;
   an input device;
   a first imaging device configured to capture one or more images of a bed of the vehicle; and
   a controller configured to:
   receive a first signal indicating a first activation of the input device;
   determine whether a speed of the vehicle is greater than a threshold in response to a receipt of the first signal;
   determine whether the vehicle is moving forward;
   instruct the display to display an image of the bed captured by the first imaging device for a first predetermined time in response to determining that the vehicle is moving forward and that the speed of the vehicle is greater than the threshold and in response to the receipt of the first signal; and
   instruct the display to display the image of the bed for a time longer than the first predetermined time in response to determining that the speed of the vehicle is less than the threshold and in response to receipt of the first signal.

2. The vehicle of claim 1, wherein the controller is configured to:
   instruct the display to display content displayed prior to the image of the bed after the image of the bed is displayed for the first predetermined time.

3. The vehicle of claim 2, wherein the content is one of a navigational map, an audio system interface, an image, or a video.

4. The vehicle of claim 1, wherein:
   the image of the bed is a zoomed bed view image, and
   a top boundary of the zoomed bed view image substantially overlaps with a top of a tailgate of the vehicle in the zoomed bed view image.

5. The vehicle of claim 1, wherein the controller is configured to:
   instruct the display to display an image captured by a second imaging device in response to determining that the speed of the vehicle is less than the threshold and in response to receipt of the first signal.

6. The vehicle of claim 5, wherein the image captured by the second imaging device is an image of a rear view of the vehicle.

7. The vehicle of claim 1, wherein the controller is configured to:
   receive a second signal indicating a second activation of the input device after receiving the first signal;
   determine whether a speed of the vehicle is greater than a threshold in response to receipt of the second signal;
   determine whether a time period between a time of the first activation of the input device and a time of the second activation of the input device is greater than a second predetermined time; and
   instruct the display to display the zoomed bed view of the vehicle for the first predetermined time in response to determining that the speed of the vehicle is greater than the threshold, determining that the time period is greater than the second predetermined time, and a receipt of the second signal.

8. The vehicle of claim 7, wherein the controller is configured to:

continue displaying a current display without changing to a zoomed bed view in response to determining that the speed of the vehicle is greater than the threshold, determining that the time period is less than the second predetermined time, and in response to the receipt of the second signal.

9. A system for monitoring a bed view of a vehicle, the system comprising:
one or more processors;
one or more memory modules; and
machine readable instructions stored in the one or more memory modules that, when executed by the one or more processors, cause the system to:
receive a first signal indicating a first activation of an input device of the vehicle;
determine whether a speed of the vehicle is greater than a threshold in response to a receipt of the first signal;
determine whether the vehicle is moving forward;
instruct a display of the vehicle to display an image of a bed captured by a first imaging device for a first predetermined time in response to determining that the vehicle is moving forward and that the speed of the vehicle is greater than the threshold and in response to the receipt of the first signal; and
instruct the display to display the image of the bed for a time longer than the first predetermined time in response to determining that the speed of the vehicle is less than the threshold and in response to receipt of the first signal.

10. The system of claim 9, wherein the machine readable instructions stored in the one or more memory modules, when executed by the one or more processors, cause the system to:
instruct the display to display content displayed prior to the image of the bed after the image of the bed is displayed for the first predetermined time.

11. The system of claim 10, wherein the content is one of a navigational map, an audio system interface, an image, or a video.

12. The system of claim 9, wherein:
the image of the bed is a zoomed bed view image, and
a top boundary of the zoomed bed view image substantially overlaps with a top of a tailgate of the vehicle in the zoomed bed view image.

13. The system of claim 9, wherein the machine readable instructions stored in the one or more memory modules, when executed by the one or more processors, cause the system to:
instruct the display to display an image captured by a second imaging device in response to determining that the speed of the vehicle is less than the threshold and in response to receipt of the first signal.

14. The system of claim 13, wherein the image captured by the second imaging device is an image of a rear view of the vehicle.

15. The system of claim 9, wherein the machine readable instructions stored in the one or more memory modules, when executed by the one or more processors, cause the system to:
receive a second signal indicating a second activation of the input device after receiving the first signal;
determine whether a speed of the vehicle is greater than a threshold in response to receipt of the second signal;
determine whether a time period between a time of the first activation of the input device and a time of the second activation of the input device is greater than a second predetermined time; and
instruct the display to display the zoomed bed view of the vehicle for the first predetermined time in response to determining that the speed of the vehicle is greater than the threshold, determining that the time period is greater than the second predetermined time, and a receipt of the second signal.

16. The system of claim 15, wherein the machine readable instructions stored in the one or more memory modules, when executed by the one or more processors, cause the system to:
continue displaying a current display without changing to a zoomed bed view in response to determining that the speed of the vehicle is greater than the threshold, determining that the time period is less than the second predetermined time, and in response to the receipt of the second signal.

17. A method for monitoring a bed view of a vehicle, the method comprising:
receiving a first signal indicating a first activation of an input device of the vehicle;
determining whether a speed of the vehicle is greater than a threshold in response to receipt of the first signal;
determining whether the vehicle is moving forward;
displaying, on a display of the vehicle, an image of a bed captured by a first imaging device for a first predetermined time in response to determining that the vehicle is moving forward and that the speed of the vehicle is greater than the threshold and in response to the receipt of the first signal; and
displaying, on the display of the vehicle, the image of the bed for a time longer than the first predetermined time in response to determining that the speed of the vehicle is less than the threshold and in response to receipt of the first signal.

18. The method of claim 17, wherein:
the image of the bed is a zoomed bed view image, and
a top boundary of the zoomed bed view image substantially overlaps with a top of a tailgate of the vehicle in the zoomed bed view image.

19. The method of claim 17, comprising:
receiving a second signal indicating a second activation of the input device after receiving the first signal;
determining whether a speed of the vehicle is greater than a threshold in response to receipt of the second signal;
determining whether a time period between a time of the first activation of the input device and a time of the second activation of the input device is greater than a second predetermined time; and
displaying the zoomed bed view of the vehicle for the first predetermined time in response to determining that the speed of the vehicle is greater than the threshold, determining that the time period is greater than the second predetermined time, and a receipt of the second signal.

* * * * *